June 9, 1942.    T. H. LEE    2,286,143
FERTILIZER DISTRIBUTOR
Filed March 5, 1940    3 Sheets-Sheet 3
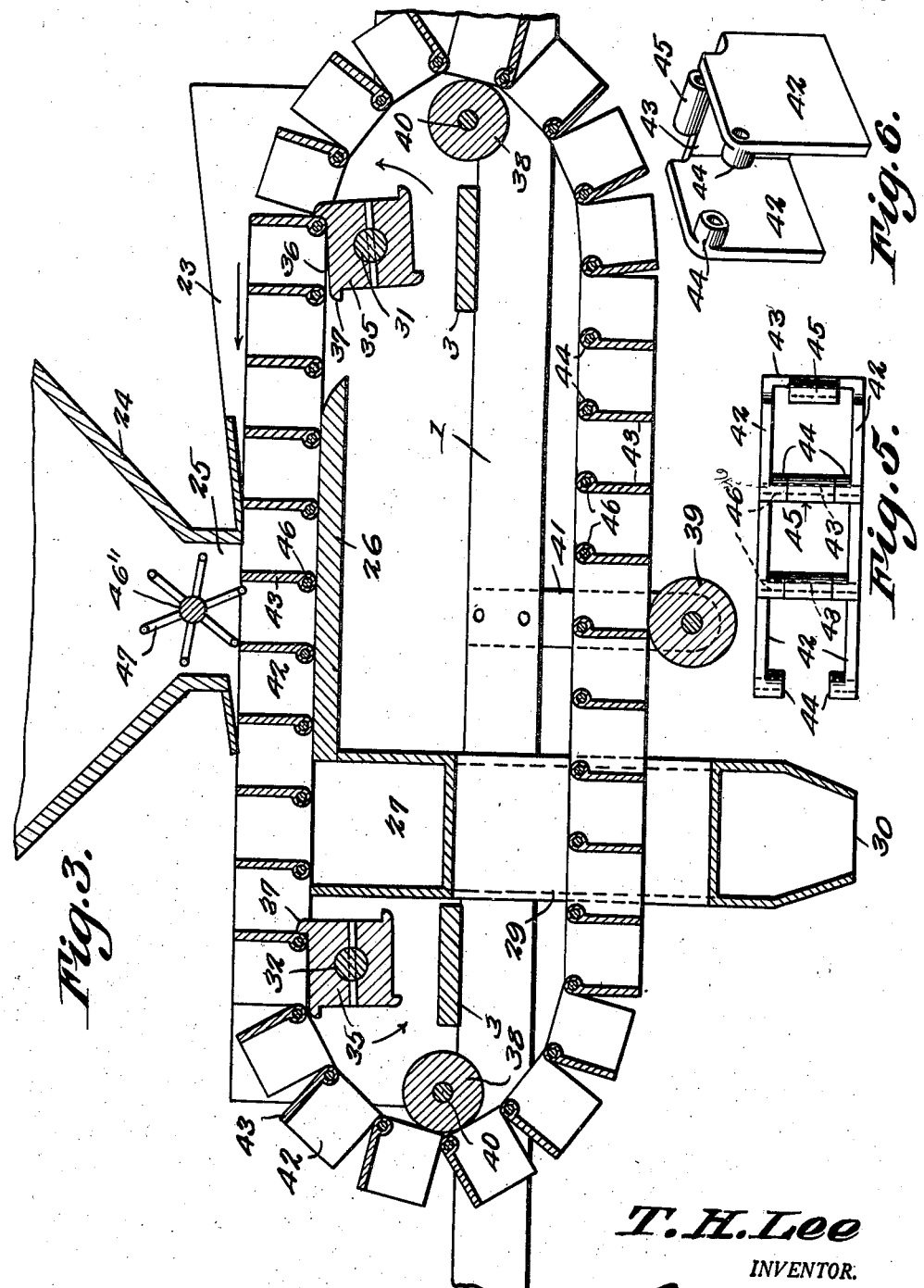
T. H. Lee
INVENTOR.
BY CBKnowles.
ATTORNEYS.

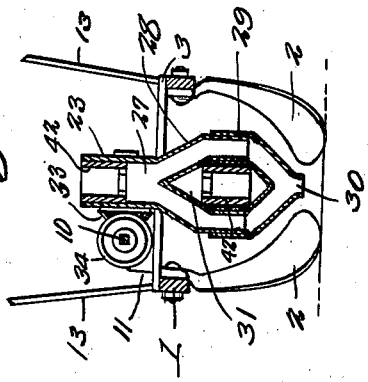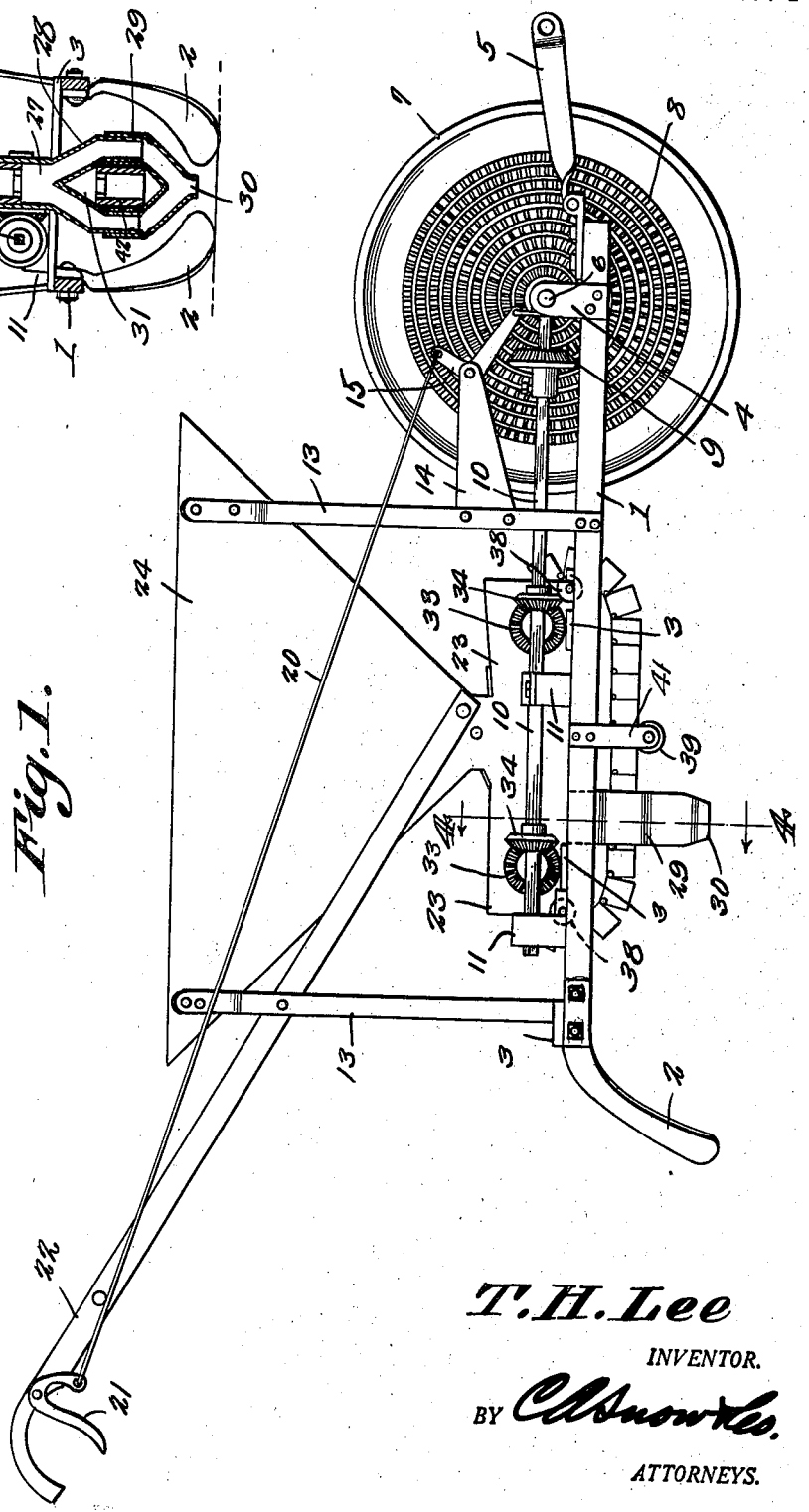

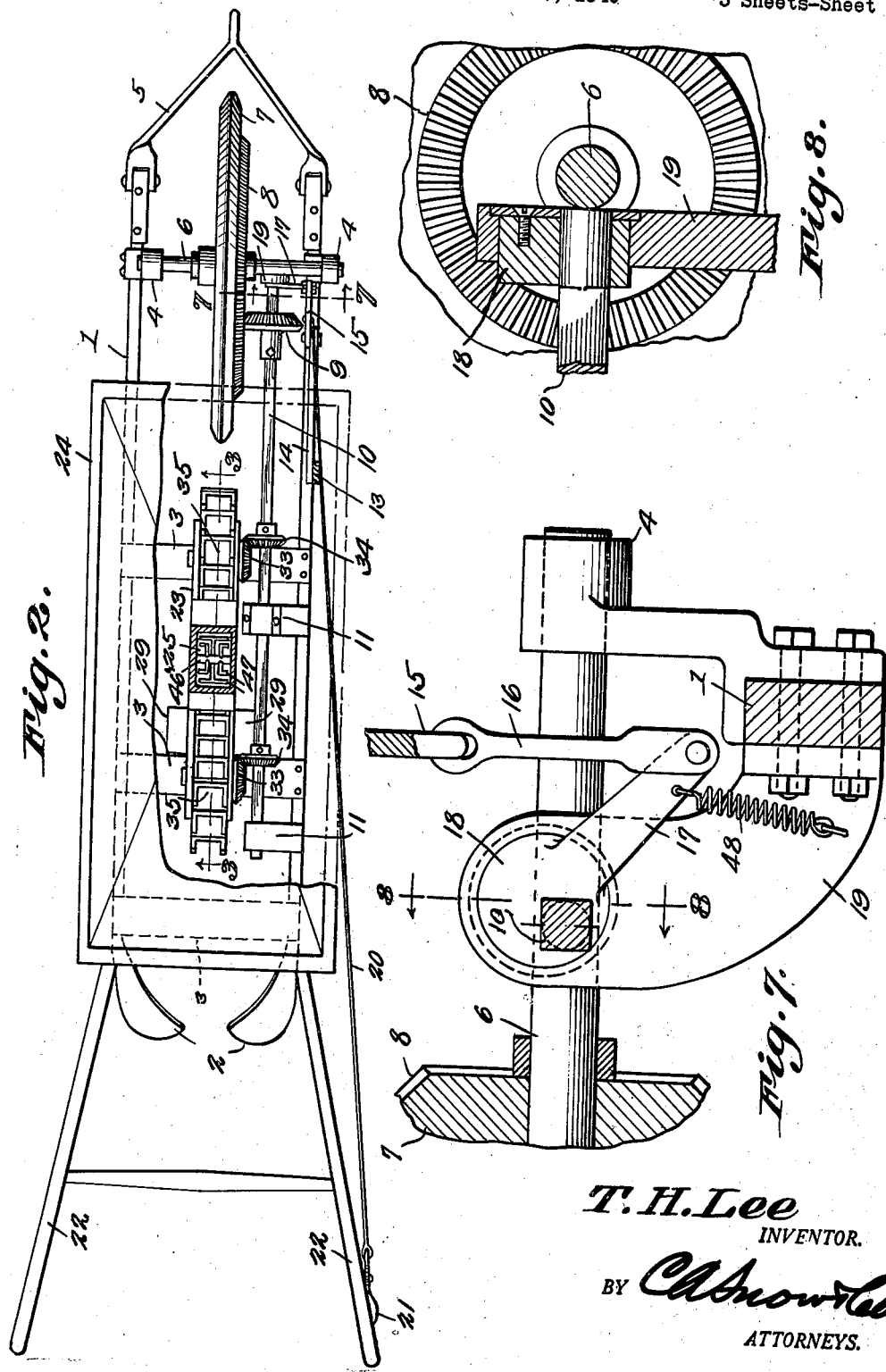

Patented June 9, 1942

2,286,143

UNITED STATES PATENT OFFICE 2,286,143

FERTILIZER DISTRIBUTOR

Troy H. Lee, Lumberton, N. C., assignor of one-half to Ben Coe, Robeson County, N. C.

Application March 5, 1940, Serial No. 322,397

6 Claims. (Cl. 221—128)

This invention relates to fertilizer distributors, one of the objects being to provide a device of this character having new and novel means for depositing the fertilizer in measured quantities within the furrow, the distributing mechanism being so constructed that the material being delivered will not clog the same but will be properly delivered whether it is in a dry or a moist condition.

A further object is to provide new and novel means for effecting agitation of the bulk material within the hopper so that it will flow freely into the dispensing portion of the distributor.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings

Figure 1 is a side elevation of the apparatus.

Figure 2 is a top plan view thereof.

Figure 3 is an enlarged section through a portion of the apparatus taken on the line 3—3, Figure 2.

Figure 4 is a section on line 4—4, Figure 1.

Figure 5 is a plan view of a portion of the dispensing belt.

Figure 6 is a perspective view of one of the links of said belt.

Figure 7 is an enlarged section on line 7—7, Figure 2.

Figure 8 is a section on line 8—8, Figure 7.

Referring to the figures by characters of reference 1 designates the side bars of the frame of the machine, these bars being provided at one end with blades 2 and at intermediate points with transverse connecting strips 3. Bearings 4 are provided on the side strips or bars while pivotally connected to the forward ends of the bars is a yoke 5 for attachment to suitable draft means.

The bearings 4 are engaged by the ends of a transverse shaft 6 on which is mounted a ground wheel 7 one side of which is provided with annular series of gear teeth 8 concentrically arranged. The teeth of any one of these series is adapted to be engaged by a gear 9 carried by a longitudinal shaft 10 mounted in fixed bearings 11 on one side portion of the frame. The forward end of the shaft is unsupported so that it is thus possible slightly to flex the shaft for the purpose of adjusting gear 9 from one position to another. This gear is held adjustably to shaft 10 by a set screw 12 or other suitable means and obviously by loosening this screw the gear 9, if spaced laterally from the teeth 8, can be slid along shaft 10 to any predetermined position after which the set screw 12 can be tightened.

Standards 13 are secured on the side bars 1 and one of them is provided with a bracket 14 on which is mounted a bell-crank 15. One arm of this bell-crank is connected by a link 16 to an arm 17 radiating from an eccentric 18 mounted for rotation within a bracket 19 secured to the inner side of one of the bars 1. Shaft 10 is journalled in this eccentric at a point removed from the center thereof. It will be obvious, therefore, that when the bell-crank 15 is actuated in one direction the eccentric 18 will be rotated to flex shaft 9 laterally so as to disengage gear 9 from the gears on the wheel 7. While the shaft is in this position and the machine at its rest, gear 9 can be adjusted longitudinally of its shaft 10 to bring it into position for engagement with any selected set of annular gear teeth 8. Thereafter the bell-crank 15 is actuated to restore shaft 10 to its normal or straight position at which time gear 9, in its new position, will move into mesh with the selected annular gear on wheel 7. Obviously by this means the speed of rotation of shaft 10 can be varied to meet the requirements. Bell-crank 15 can be shifted by any suitable means. For example, and as shown in Figure 1, one arm thereof can be connected by a rod 20 to a hand lever 21 mounted on one of the handles 22 of the machine.

Side boards 23 are connected to and extend longitudinally of the bars 1 to form therebetween a channel open at the ends and supported by the standard 13 are the downwardly converging walls of a hopper 24 which lead downwardly to a throat 25 which in turn opens downwardly into the channel formed by the side boards 23. This channel has a bottom 26 in that portion thereof beneath the throat 25 and at the forward end of the bottom 26 there is located an outlet opening forming a pocket 27 which opens downwardly into downwardly diverging spouts 28 which, in turn, merge into parallel portions 29 which, at their lower ends, converge to a common outlet 30. Thus a space 31 is provided between the opposed spouts, this space being located beneath the pocket 27 as shown particularly in Figure 4.

Journalled within the side boards 23 are transverse shafts 31 and 32 provided at one end with gears 33 adapted to receive motion through gears 34 from the shaft 10 to which the gears 34 are fastened.

Secured to each of the shafts 31 and 32 are angular rolls 35 having flat faces 36. During the operation of the machine these rolls are adapted to rotate in the direction indicated by the arrows in Figure 3 and the advancing edge of each face 36 of each roller has a projecting lip 37 constituting a flange projecting from the back edge of the flat face in advance thereof. These rolls are so located and proportioned that when each upper face is brought to a substantially horizontally position, it will substantially align with the top surface of the bottom 26.

An endless belt is mounted on the rolls 35, slidably engages the top surface of bottom 26, extends downwardly between the boards 23, and has its downwardly extending and bottom portions guided by idler rolls 38 and 39, the rolls 38 being supported on shafts 40 mounted in the side boards 23 while the roll 39 is supported by hangers 41 depending from the side bars 1.

The belt is made up of pivotally connected links one of which has been shown in detail in Figure 6. Each link includes side plates 42 connected at one end by an end plate 43. Lugs 44 are extended toward each other from the side plates 42 at one corner at each of said plates while formed on the back plate 43 is a sleeve 45 so positioned as to be seated between the lugs 44 of the next adjoining link when the members of the belt are assembled. These lugs and sleeves are adapted to receive pivot pins 46.

Each of these belt links is so proportioned as to momentarily rest flat upon one of the faces 36 of each roll 35 during the operation of the mechanism and when each link is thus located, the lip 37 of the next following flat face of the roll will extend back of the end plate 43 of the engaged link as shown particularly in Figure 3. Thus as the rolls rotate in the directions indicated by the arrows in Figure 3, these lips will act to engage and propel the belt formed by the pivotally connected links and bring the links successively into position between the throat 25 and the bottom 26 and, thereafter, successively into position over the pocket 27.

A shaft 46 is mounted to rotate freely within the throat 25 and has agitating fingers 47 radiating therefrom. These fingers can be of any desired shape and size. It is merely essential that the lowermost fingers extend downwardly into the paths of the end plates 43 of the links so that as the belt is actuated, the plates 43 will come successively against those fingers in the paths thereof and thereby cause the shaft 46 to rotate and the fingers thereon to agitate the material in the throat and in the bottom portion of the hopper 24.

The handles 22 heretofore referred to can be secured in place in any preferred manner. Not only can they be attached to the rear standards 13 but they can also be attached to the lower portion of the hopper 24 as shown.

The blades 2 which are downturned from the back end of the side bars 1 constitute covering blades whereby soil may be directed into the furrow after fertilizer has been deposited therein. These blades can be made integral with or separate from the side bars as will be apparent.

In practice the fertilizer or other material to be deposited in a furrow is placed in the hopper 24 and as the device is moved forwardly, wheel 7 will rotate and the meshing gears 8 and 9 will transmit motion through shaft 10 and gears 33 to the rolls 35. These rolls will be driven in the direction indicated by the arrows in Figure 3 and will cause the dispensing belt to move in the direction indicated by arrows in Figure 3. Consequently the pockets formed by the cooperating links of the belt will be brought successively into position under the throat 25 whereupon the loosened material thereabove will gravitate into the pockets and be dragged along the bottom 25 until it reaches the pocket 27. At this point the material will gravitate into the pocket and thence be distributed to the diverging spouts 28 through which it will flow downwardly to the outlet 30. These spouts are spaced apart to provide the opening 31 so that the lower portion of the endless belt can travel between the spouts as shown in Figure 4.

Importance is attached to the fact that by providing a dispensing means such as herein described, the material can be delivered in measured quantities. Furthermore, this material can be deposited at any desired speed simply by changing the gear 9 relative to the gears 8 so as to speed up or slow down the movement of the belt. As the pockets formed by the links open as they move downwardly away from the point of delivery, there is no danger of these pockets remaining clogged. Instead any material which may be left therein after the point of delivery has been passed, will be dislodged and drop into the soil. However, because of the relative movement of the links forming the belt, it is usual for all of the contents of the belt pockets to be delivered into the spouts. The bulk material in the hopper is kept agitated by the intermittently rotated fingers 47 receiving their motion from the plates 43 of the belt links. Thus choking of the throat 25 is prevented.

The covering blades 2 can be made detachable, as shown, so that other soil-engaging devices, such as plows, can be substituted therefor.

If preferred, and as shown in Figure 4, the downwardly converging portions of the outlet spouts can be made to telescope onto the parallel side portions so that instead of having a single outlet 30, the downwardly converging lower portions can be removed and the fertilizer delivered in parallel streams.

A spring 48 can connect arm 17 to bracket 19 to hold the arm normally in one position.

What is claimed is:

1. In a fertilizer distributor a structure including a channel having a closed bottom, a delivery pocket at one end of said bottom and opening upwardly into the channel, a hopper having a throat opening downwardly into the channel above said bottom, and three-sided links pivotally-connected to provide pockets open at the top and bottom and forming an endless belt movable in one direction along said bottom, one wall of each link constituting a closure for the advancing side of a pocket of an adjoining link, the walls of those links above the bottom of the channel being in contact with the channel bottom and the free edges of the side walls of each of said links contacting the transverse wall of the adjacent link, thereby to prevent leakage of powdered material in any direction from the pockets formed thereby.

2. A device of the class described including a structure having a channel provided with a bottom and a delivery chute in communication with the channel at one end of said bottom, a hopper having a throat opening downwardly into the channel, an endless belt movable in one direction along said bottom comprising pivotally-connected three-sided links, said links cooperating to provide pockets open at the top and bottom, one side of each link constituting a closure for the advancing side of the pocket of the next adjoining link, the walls of those links above the bottom of the channel being in contact with the channel bottom and the free edges of the side walls of each of said links contacting the transverse wall of the adjacent link, thereby to prevent leakage of powdered material in any direction from the pockets formed thereby, and a means for moving the belt between the throat and the bottom of the channel and across the chute.

3. A device of the class described including a channelled structure having a bottom and an outlet opening at one end of the bottom, a hopper opening downwardly into the channel above the bottom, an endless belt movable in one direction along said bottom comprising pivotally-connected three-sided links cooperating to form pockets open at the top and bottom, one side of each link constituting a closure for the advancing side of the pocket of the next adjoining link, the walls of those links above the bottom of the channel being in contact with the channel bottom and the free edges of the side walls of each of said links contacting the transverse wall of the adjacent link, thereby to prevent leakage of powdered material in any direction from the pockets formed thereby, angular rolls engaging the belt and each having projecting lips, and means for simultaneously actuating said rolls to propel the belt along the bottom of the channel and beneath the hopper and across the outlet opening.

4. A device of the class described including a channelled structure having a bottom and an outlet opening at one end of the bottom, a hopper opening downwardly into the channel in said structure and above the bottom thereof, pivotally connected links forming an endless belt movable in one direction along said bottom, each of said links including side walls and a connecting wall, each connecting wall constituting a closure for the advancing side of the next adjoining link, said links cooperating to provide pockets open at the top and bottom, rolls engaging the links, means for simultaneously actuating the rolls to move the belt along the bottom of the channel to close the bottoms of the pockets and position the pockets successively to receive material from the hopper, the walls of those links above the bottom of the channel being in contact with the channel bottom and the free edges of the side walls of each of said links contacting the transverse wall of the adjacent link, thereby to prevent leakage of powdered material in any direction from the pockets formed thereby.

5. A device of the class described including a channelled structure having a bottom and an outlet opening at one end of the bottom, a hopper opening downwardly into the channel in said structure and above the bottom thereof, pivotally connected links forming an endless belt movable in one direction along said bottom, each of said links including side walls and a connecting wall, each connecting wall constituting a closure for the advancing side of the next adjoining link, said links cooperating to provide pockets open at the top and bottom, rolls engaging the links, means for simultaneously actuating the rolls to move the belt along the bottom of the channel to close the bottoms of the pockets and position the pockets successively to receive material from the hopper and deliver the material from the pockets to the outlet opening, the walls of those links above the bottom of the channel being in contact with the channel bottom and the free edges of the side walls of each of said links contacting the transverse wall of the adjacent link, thereby to prevent leakage of powdered material in any direction from the pockets formed thereby, and agitating means mounted for rotation within the hopper, said means including radial fingers mounted for rotation about a common axis and positioned for successive engagement by the connecting walls of the links.

6. In a fertilizer distributor a structure including a channel, a hopper opening downwardly into the channel, said channel having an outlet opening in the bottom thereof at a point removed from the hopper, a plurality of links each having three sides and open at the top and bottom, each link including side walls and an end plate connecting the side walls at one edge, the bottom edges of the side walls and of the connecting plates being positioned to engage and slide along the bottom of the channel, said side walls of each link being normally seated against the connecting plate of the next adjoining link thereby to provide a pocket open at the top and adapted to be closed at the bottom by the bottom of the channel, said links cooperating to provide an endless belt and to prevent the belt from sagging while passing over the outlet opening, and rotatable means surrounded by the belt for driving and guiding the belt for movement over and under the channelled structure.

TROY H. LEE.